United States Patent [19]

Thau

[11] Patent Number: 5,035,528

[45] Date of Patent: Jul. 30, 1991

[54] CONNECTOR WITH LOCKABLE BUSHING

[75] Inventor: Wolfgang Thau, Aurora, Canada

[73] Assignee: KTM Locks CMT Group Division of Magna International Inc., Concord, Canada

[21] Appl. No.: 526,537

[22] Filed: May 21, 1990

Related U.S. Application Data

[63] Continuation of Ser. No. 412,626, Sep. 27, 1989, abandoned, which is a continuation of Ser. No. 164,404, Mar. 4, 1988, abandoned.

[30] Foreign Application Priority Data

Mar. 6, 1987 [CA] Canada ................... 531448

[51] Int. Cl.⁵ .............................................. F16B 7/04
[52] U.S. Cl. .................................. 403/290; 403/313; 403/107
[58] Field of Search ............... 403/309, 313, 289, 290, 403/314, 344, 354, 361, 107, 104, 188, 195, 70, 71

[56] References Cited

U.S. PATENT DOCUMENTS

| | | | |
|---|---|---|---|
| 1,667,485 | 4/1928 | MacDonald | 403/290 X |
| 2,066,276 | 12/1936 | Harrall et al. | 403/290 X |
| 2,443,249 | 6/1948 | Jackson | 403/107 X |
| 2,887,929 | 5/1959 | Farmer | 403/107 |
| 3,710,645 | 1/1973 | Bennett | 403/107 X |
| 4,306,820 | 12/1981 | Nelson | 403/71 X |
| 4,329,800 | 5/1982 | Shuman | 403/107 X |
| 4,482,265 | 11/1984 | Koza | 403/71 |
| 4,602,887 | 7/1986 | Konchan | 403/24 |
| 4,694,544 | 9/1987 | Chapman | 403/290 X |
| 4,710,052 | 12/1987 | Elger | 403/314 X |
| 4,733,625 | 3/1988 | Allen | 403/289 X |
| 4,765,199 | 8/1988 | Andersen et al. | 403/290 X |

Primary Examiner—Peter M. Cuomo
Attorney, Agent, or Firm—Ivor M. Hughes; Neil H. Hughes

[57] ABSTRACT

A connector comprising two components, a male component and a female component, the female component comprising securing element for securing the male component to a member and comprising at least a pair of arms spaced from one another and moveable towards one another and carrying fastening elements on the surfaces of the arms closest the other arm (i.e. between the arms) and a male component comprising a projection having a leading and rearward end carrying complementary fastening elements on the outer surface of the projection proximate the leading end for mating with the fastening elements of the two arms when the projection is pushed between the arms and the arms are clamped over the projection, the rearward end of the male component carrying slideable bushing means for riding over the two arms when they are clamped over the projection thereby providing a secure connection between the two, and connecting the rearward end to the other member to which the member is connected.

16 Claims, 2 Drawing Sheets

CONNECTOR WITH LOCKABLE BUSHING

FIELD OF THE INVENTION

This invention relates to connectors suitable for use to connect components together in different relative positions to one another depending on the circumstances and finds particular application to self adjusting clips suitable for use actuating links (rods) to mechanical components for example in automotive door applications.

BACKGROUND OF THE INVENTION

Presently, to connect components in a very limited working space as in the automobile industry in the assembly of doors, the assembler must fasten components together using separate or individual connectors which are not easily located and then secured to both components to be secured.

Presently, in the connection of a door latch to an L-shaped actuating rod, a specialized clip comprising a pair of angularly disposed channels (one extending downwardly and the other extending horizontally) is first connected to the latch, the latch is mounted in the door, the actuating rod is mounted in the door and one arm of the L-shaped rod is inserted into the downwardly extending channel in the specialized clip with great difficulty. Then the horizontally extending channel in the clip is brought to engage the other arm of the actuating rod and the arm snaps into the channel being secured thereto.

As is apparent, the steps of assembly require manipulation in a very confined space and many times assembly is incomplete or broken and the connection must be remade at a later date (usually after a complaint by a customer —an after purchase service situation).

It is therefore an object of this invention to provide an improved connector for connecting components together and suitable use for example for connecting a latch mechanism to an actuating rod.

It is a further object of this invention to provide such connector which reduces labour of assembly in confined spaces providing a more positive "lock" when connecting the components.

It is a further object of this invention to provide such connector which reduces after purchase service requirements.

It is still a further object of this invention to provide such connector which reduces the overall cost of assembly and subsequent service.

Further and other objects of the invention will be realized by those skilled in the art from the following summary of the invention and detailed description of an embodiment thereof.

SUMMARY OF INVENTION

According to one aspect of this invention, there is provided a connector for connecting two members together, the connector comprising two components, a male component and a female component, the female component comprising securing means for securing the male component to one member and comprising at least a pair of flexible portions (for example arms) spaced from one another and moveable towards and away from one another and carrying fastening elements each element of the same configuration on the surfaces of the portions (for example arms) closest the other portion (for example arm in one embodiment between the arms), and a male component comprising a projection of uniform cross-section having leading and rearward ends carrying complementary fastening elements of a complementary configuration to the fastening elements on the outer surface of the projection proximate the leading end for mating with the fastening elements of the two portions (for example arms) when the projection is pushed between the portions (for example arms) and the portions (for example arms) are clamped over the projection, one of the components for example, the rearward end of one of the components (for example the male component), carrying slideable bushing means for riding over the two portions (for example arms) and clamping them over the projection, thereby providing a secure connection between the two, and means connecting the rearward end of the male component to the other member to which the one member is to be connected. (This means connecting the rearward end may be the male portion, may be part of the other member and be formed as part thereof.). Particularly the member may be a car door latch and the other member may be an actuating rod (which is connected to a handle, for example). In this connection, because the portions (for example arms) are long, the projection may be inserted between the portions (for example arms) to such position as is required (for example, changes in the length of the projection or portions (for example arms) due to manufacturing defects) thus having a wide tolerance in use being able to accommodate the connection of components at different positions in the door assembly using the same connector.

The portions (for example arms) on the end may be chamfered as may be the mouth of the bushing for assisting in alignment of the components to be connected.

The invention will now be illustrated with reference to the following description of embodiments of the invention.

DETAILED DESCRIPTION OF THE DRAWINGS

Figure 1:
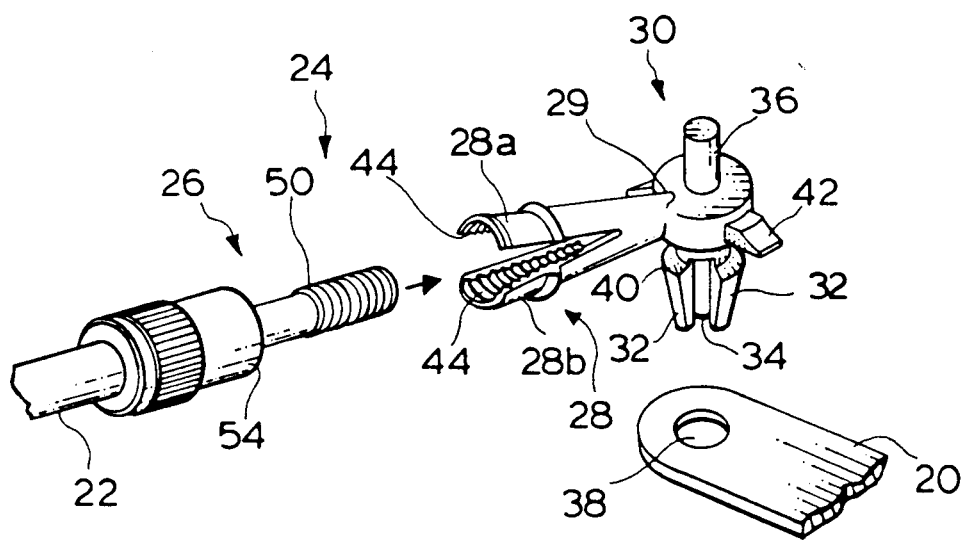
FIG. 1 is a perspective view of a connector constructed according to an embodiment of the invention and used to secure a latch to an actuating rod.
Figure 2:
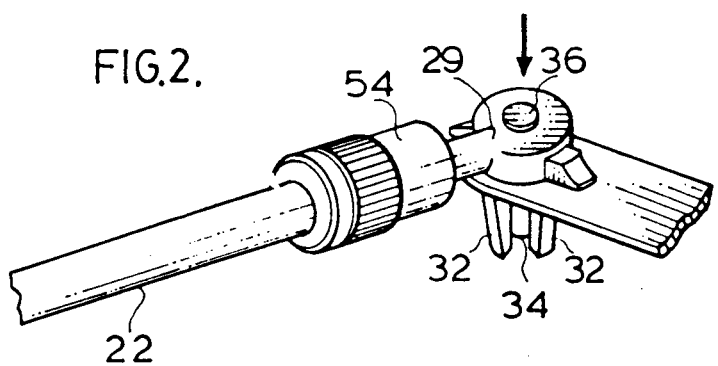
FIG. 2 is a perspective view of the connection of the components shown in FIG. 1.
Figure 3:
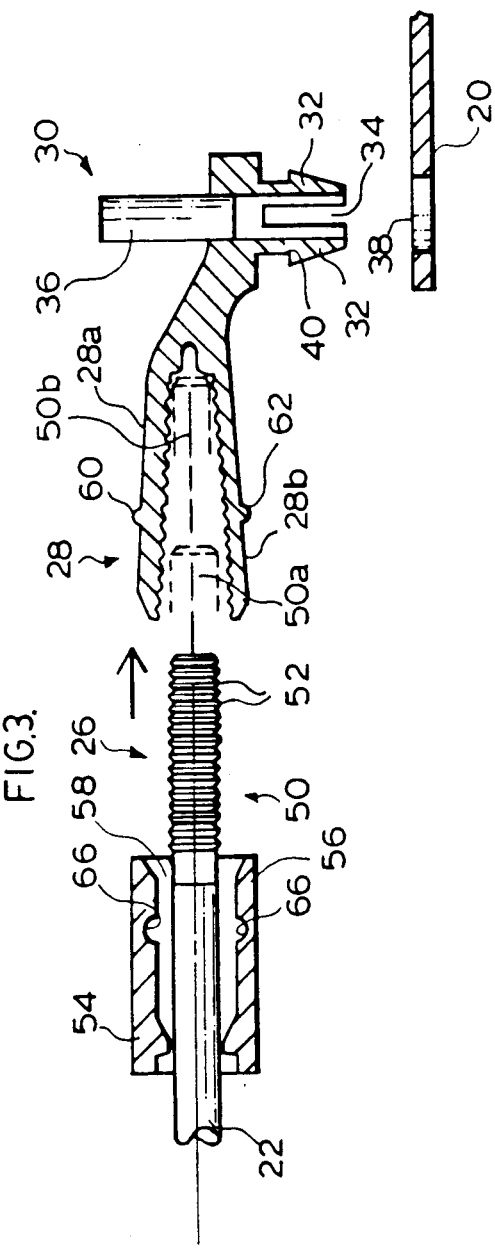
FIG. 3 is a cross-sectional side view of the structure shown in FIG. 1.
Figure 4:
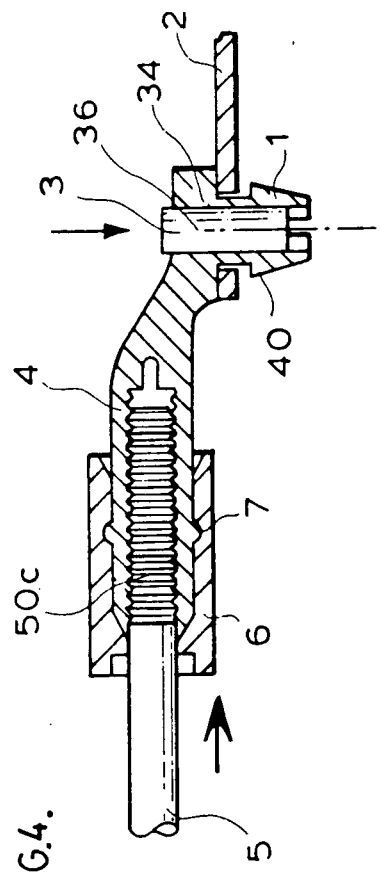
FIG. 4 is a cross-sectional side view of the structure shown in FIGS. 2 being connected.

With reference to FIG. 1 there is shown lever 20 of latch mechanism (not shown) for connection to actuating rod 22 by connector 24 comprising two components, a male component 26 and a female component 28, the female component comprising a securing element generally indicated at 30 34 therebetween for receiving pin 36 which when arms 32 are squeezed together and pushed through aperture 38, barbs or triangular wedge portions 40 are positioned behind (below) lever 20 and when pin 36 is pushed into bore 34 (see FIG. 4), barbs 40 preclude the removal of the securing element 30 from connection with lever 20. Tab 42 is an anti-rattle device lying on lever 20 (see FIG. 2). Female component 28 also comprises a pair of arms 28A and 28B spaced from body 29. The arms 28A and 28B carry fastening elements 44 (being annular parallel grooves and ridges). Male component 26 comprises projection 50 carrying complementary annular ridges and grooves 52 (to elements 44) for mating therewith and for being locked together to preclude relative movement therebetween when projection 50 is inserted between arms 28A and 28B and they are moved together to clamp projection 50 between arm 28A and 28B. Actuating rod 22 also carries bushing 54 comprising cylindrical wall 56 surrounding base 58 (see FIG. 3) for receiving arms 28A and 28B (after being clamped to projection 50) and lock raised ribs 60 and 62 in annular recess 66 within bore 58. Thus, bushing 54 is deformable (comprising plastics material in one embodiment) to permit ribs 60 and 62 to enter annular recess 66 and is slidable along rod 22 (see FIG. 3).

As is apparent, when the connection is made (see FIGS. 2 and 4) relative movement of the projection 50, arms 28A and 28B and bushing 54 is precluded. As is apparent, because the fastening elements on arms 28A and 28B and projection 50 permit the two components to be secured in a number of positions (see FIG. 3 at 50A and 50B) (and 50C in FIG. 4) thus permitting large tolerance between the members to be connected.

Figure 5:
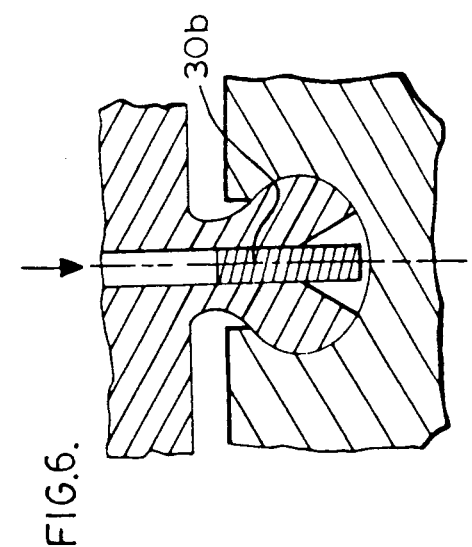
FIG. 5 illustrates an alternative securing of one of the components of the connector for angular movement.
Figure 6:
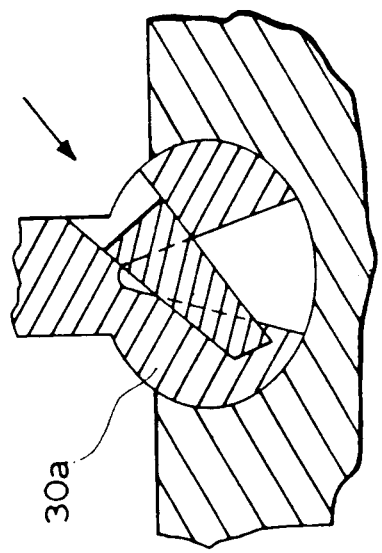
FIG. 6 illustrates another alternative securing of one of the components of the connector for angular movement.

With respect to other uses, securing member 30 is modified as shown in FIGS. 5 and 6) both 30A and 30B permitting angular relative movement not just movement in one horizontal plane. Thus the uses the connector may be reliably and securely put to may be cable connections, mechanism connections, actuating handles in doors and particularly outside handles. For inboard and outboard adjustment the connectors may be put to window regulator attachment (inboard-outboard) adjustment for fitting glass/regulator/mounting surface (inner door panel) together, mirrors relative to the housing.

As many changes can be made to the embodiments of the invention without departing from the scope of the invention it is intended that all material herein be interpreted as illustrative of the invention and not in a limiting sense.

I claim:

1. A connector for connector for connecting two members together, the connector comprising two components, a male component and a female component, the female component comprising securing means for securing the male component to one member and comprising at least a pair of flexible portions spaced from one another and moveable towards one another to provide a space therebetween of substantially uniform cross-section and away from one another and each flexible portion having spaced ends and carrying fastening elements between the ends, each element of the same configuration on the surfaces of the portions closest the other portion, the male component comprising a projection of substantially uniform cross-section having a leading and rearward end and carrying complementary fastening elements, of a complementary configuration to the fastening elements on the surfaces of the portions closest the other portion of the female component, on the outer surface of the projection proximate the leading end for mating with the fastening elements of the two portions when the projection is pushed between the portions and positioned between the spaced ends of the flexible portions at one of a plurality of positions within the flexible portions and the portions being clamped over the projection to thereby lock the projection between the flexible portions at one of a plurality of positions by the intermeshing of the fastening elements on the flexible portions and the complementary fastening elements of the projection, slideable deformable bushing means for riding over the two portions and clamping them over the projection and being locked on the two portions thereby providing a secure connection between the male and female components, the deformable bushing means having locking means disposed therewith for engaging detent means with the female component when the bushing means is slid over the two portions, and means connected to the rearward end of the male component.

2. The connector of claim 1, wherein the portions may comprise a pair of arms.

3. The connector of claim 2, wherein the means connecting the rearward end may be part of the other member and formed as part thereof.

4. The connector of claim 3, wherein the member is a car door latch and the other member is an actuating rod.

5. The connector of claim 4 wherein the arms on the end may be chamfered as may be the mouth of the bushing for assisting in alignment.

6. The connector of claim 3, wherein the arms on the end may be chamfered as may be the mouth of the bushing for assisting in alignment.

7. The connector of claim 2, wherein the member is a car door latch and the other member is an actuating rod.

8. The connector of claim 7, wherein the arms on the end may be chamfered as may be the mouth of the bushing for assisting in alignment.

9. The connector of claim 1, wherein the means connecting the rearward end may be part of the other member formed as part thereof.

10. The connector of claim 9, wherein the member is a car door latch and the other member is an actuating rod.

11. The connector of claim 1, wherein the member is a car door latch and the other member is an actuating rod.

12. The connector of claim 11, wherein the complementary fastening elements on the projection of substantially cross-section comprises a plurality of raised annular ridges spaced by annular recesses and the fastening elements on each flexible portion comprise complementary arcuate recess portions spaced by arcuate ridge portions, the arcuate recess portions for receiving the annular ridges of the projection and the arcuate ridge portions for being received in the annular recesses of the projection.

13. The connector of claim 12, wherein the arms on the end may be chamfered as may be the mouth of the bushing for assisting in alignment.

14. The connector of claim 1, wherein the complementary fastening elements on the projection of substantially uniform cross-section comprises a plurality of raised annular ridges spaced by annular recesses and the fastening elements on each flexible portion comprise complementary arcuate recess portions spaced by arcuate ridge portions, the arcuate recess portions for receiving the annular ridges of the projection and the arcuate ridge portions for being received in the annular recesses of the projection.

15. The connector of claim 14, wherein the arms on the end may be chamfered as may be the mouth of the bushing for assisting in alignment.

16. The connector of claim 1, wherein the arms on the end may be chamfered as may be the mouth of the bushing for assisting in alignment.

* * * * *